May 12, 1931.  E. JACOBUS  1,804,935
MACHINE ELEMENT
Filed March 7, 1929
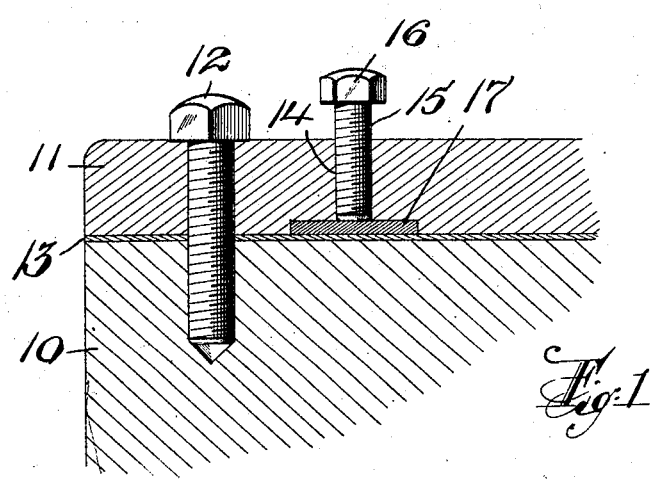
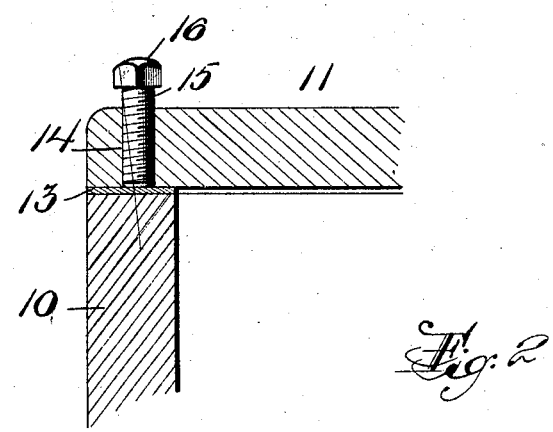
INVENTOR
Edward Jacobus,
BY
Wm H Canfield.
ATTORNEY Patented May 12, 1931

1,804,935

UNITED STATES PATENT OFFICE

EDWARD JACOBUS, OF EAST ORANGE, NEW JERSEY

MACHINE ELEMENT

Application filed March 7, 1929. Serial No. 345,187.

This invention relates to a machine element and is adapted for wide use in many machines and devices but it is described as applied to the cylinder of an internal combustion engine in order to clearly demonstrate its function. The construction is applicable, however, to various devices such as the lids of containers, and many other articles.

The object of the invention is to utilize the resistance of one member to pry or move a second member from it. In the case of cylinder heads, for instance, it is usual to remove the bolts that hold the head to the cylinder block and then pry from the edges with a chisel or wedge to loosen the head from its firm seat caused by long subjection to heat, rust and other conditions that cause the parts to be practically sealed. The use of a hammer direct on the cylinder head is often necessary. These treatments sometimes crack the cylinder head or the edges of the casting are chipped, or the gasket is marred and a new one is required and often on being again assembled the parts leak.

The invention provides a steady even means for separating the parts without shock or jar or any driving of wedge-shaped tools between the members.

The invention specifically comprises two members, one of which has an opening extending through it but the other member is provided with a solid surface and this surface serves as an abutment so that a tool can be used against the abutment and on the wall of the opening to force the members apart. The most convenient tool is an ordinary screw fitting in the opening.

The invention will be better understood from an inspection of the drawings in which Figure 1 is a section of two machine elements equipped with my new separating device and Figure 2 is a section of a modification.

In the drawings I show a construction including a member 10 such as a cylinder block and a member 11 which may be a cylinder head. These are fastened together by means such as bolts 12, and with the gasket 13 between them. The member 11 has an opening 14 which receives a tool such as the screw 15 with a suitable head 16 or other means for turning it.

In this form I show a plate 17 to present a wide surface to engage the gasket. After the bolts 12 are removed the member 11 is raised by turning screw 15 and two members are gently and positively separated.

In Figure 2 I show a construction in which the screw 15 rests directly on the gasket 13 or it may extend through to the member 10 and it functions in the same way as above described.

The time and labor saved by this construction makes it one of great utility and furthermore the parts are not subjected to wedging or to blows to separate them.

By this device, assuming it to be used on cylinder heads of automobile engines, these bolts 15 are placed at appropriate places around the head and in this way the cylinder head can be lifted without any appreciable canting or tilting and can thus be maintained substantially parallel to its seat. This not only will prevent strain on the cylinder head but will cause the head to raise straight up on bolts that may be used for seating it on the engine block.

These bolts are always in place, are part of the construction, need not be much longer than the thickness of the cylinder head and all that is necessary to raise the cylinder head is to utilize a wrench on these bolts, thus avoiding the necessity of possessing or carrying any special tools.

I claim:

In a motor combination of a cylinder block and a cylinder head, a gasket seated between them, bolts securing the parts together to form a tight closure, and spaced bolts screwed into the cylinder head and adapted to be forced against the element beneath when the first mentioned bolts are removed whereby the cylinder head can be raised evenly to prevent damage to said gasket.

In testimony whereof he affixes his signature.

EDWARD JACOBUS.